J. M. HURT.
Plant Protector.
No. 83,386.
Patented Oct. 27, 1868.
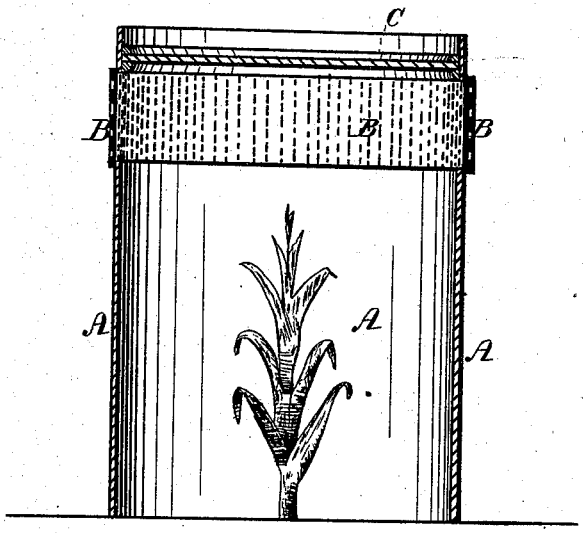
WITNESSES:
INVENTOR:

J. M. HURT, OF BLACKS AND WHITES, VIRGINIA.

Letters Patent No. 83,386, dated October 27, 1868.

IMPROVEMENT IN PLANT-PROTECTOR.

The Schedule referred to in these Letters Patent and making part of the same.

*To all whom it may concern:*

Be it known that I, J. M. HURT, of Blacks and Whites, in the county of Nottoway, and State of Virginia, have invented a new and useful Improvement in Plant-Protectors; and I do hereby declare that the following is a full, clear, and exact description thereof, which will enable others skilled in the art to make and use the same, reference being had to the accompanying drawings, forming part of this specification, in which the drawing shows a sectional elevation of my improvement.

Similar letters of reference indicate like parts.

The object of this invention is to provide a simple, cheap, and effective cover for plants, to protect them from frost, insects, and to facilitate their early growth.

It consists of a hollow cylinder, made of any suitable material and size, provided with a glass top near one end, and perforated for a suitable proportionate part of its length from the end having the glass cover, which is to be set over the plant, for the purpose of protecting it, as will be more fully described on reference to the accompanying drawings, wherein—

A represents a hollow cylinder, made of sheet-metal, or any other suitable material, and of any suitable size, which is provided with a glass top at C, a short distance below the end, which may be secured in any suitable manner by solder, or by grooving the end of the cylinder.

The cylinder is perforated for a short distance below the glass cover, as shown at B, for the purpose of admitting air, and preventing the approach of insects to the plant, while, through the glass, light and heat are admitted, to facilitate its growth.

Having thus described my invention,

I claim as new, and desire to secure by Letters Patent—

As a new article of manufacture, the plant-protector, consisting of the cylinder A, adapted to rest upon the ground over the plant, perforated circumferentially near its top, at B, and provided with the horizontal glass top C, as herein described, for the purpose specified.

J. M. HURT.

Witnesses:
    THOMAS W. SYDNOR,
    A. ECKLES.